(12) United States Patent
Vu et al.

(10) Patent No.: US 12,452,396 B2
(45) Date of Patent: Oct. 21, 2025

(54) SENSOR FOR SAFE DETECTION OF INTRUSIONS IN A 3D VOLUME

(71) Applicant: Symbotic LLC, Wilmington, MA (US)

(72) Inventors: Clara Vu, Cambridge, MA (US);
Alberto Moel, Cambridge, MA (US);
Scott Denenberg, Newton, MA (US);
Marek Wartenberg, Chelsea, MA (US); Eric Cobane, North Grafton, MA (US)

(73) Assignee: Symbotic LLC, Wilmington, MA (US)

( * ) Notice: Subject to any disclaimer, the term of this patent is extended or adjusted under 35 U.S.C. 154(b) by 67 days.

(21) Appl. No.: 18/541,204

(22) Filed: Dec. 15, 2023

(65) Prior Publication Data

US 2024/0163415 A1    May 16, 2024

Related U.S. Application Data

(63) Continuation-in-part of application No. 17/103,427, filed on Nov. 24, 2020, which is a continuation of application No. 16/553,724, filed on Aug. 28, 2019, now Pat. No. 10,887,578.

(60) Provisional application No. 63/438,022, filed on Jan. 10, 2023, provisional application No. 62/724,941, filed on Aug. 30, 2018.

(51) Int. Cl.
| | |
|---|---|
| *H04N 13/271* | (2018.01) |
| *G01K 13/00* | (2021.01) |
| *G06T 7/80* | (2017.01) |
| *H04N 13/00* | (2018.01) |
| *H04N 13/194* | (2018.01) |
| *H04N 13/204* | (2018.01) |
| *H04N 13/246* | (2018.01) |
| *H04N 13/254* | (2018.01) |
| *H04N 25/60* | (2023.01) |

(52) U.S. Cl.
CPC ............ *H04N 13/246* (2018.05); *G06T 7/85* (2017.01); *H04N 13/194* (2018.05); *H04N 13/204* (2018.05); *H04N 13/254* (2018.05); *H04N 13/271* (2018.05); *H04N 25/60* (2023.01); *G01K 13/00* (2013.01); *H04N 2013/0081* (2013.01)

(58) Field of Classification Search
CPC ......... H04N 2013/0081; H04N 13/204; H04N 13/271
See application file for complete search history.

(56) References Cited

U.S. PATENT DOCUMENTS

| | | |
|---|---|---|
| 6,243,165 B1 | 6/2001 | Norita et al. |
| 9,137,511 B1 | 9/2015 | Legrand, III et al. |
| (Continued) | | |

FOREIGN PATENT DOCUMENTS

| | | |
|---|---|---|
| KR | 10-2404971 B1 | 6/2022 |

OTHER PUBLICATIONS

International Search Report and Written Opinion for related International Application No. PCT/US2024/010638 dated May 8, 2024, 7 pages.

*Primary Examiner* — Jayanti K Patel
*Assistant Examiner* — Christopher Kingsbury Glover
(74) *Attorney, Agent, or Firm* — Perman & Green, LLP

(57) ABSTRACT

In various embodiments, systems and methods for safely operating machinery such as industrial robots signal intrusions into and/or above computationally defined safeguarded volumes in a workspace during sensor monitoring of the workspace. Various related actions may be taken in response thereto, including restricting operation of the machinery and/or issuing safety or occlusion signals.

34 Claims, 8 Drawing Sheets

(56) References Cited

U.S. PATENT DOCUMENTS

| | | |
|---|---|---|
| 9,452,531 B2 | 9/2016 | Kikkeri et al. |
| 9,520,040 B2 | 12/2016 | Mavromatis |
| 9,866,740 B2 | 1/2018 | Lewkow |
| 9,915,929 B1 | 3/2018 | Dubinsky et al. |
| 9,979,953 B1 | 5/2018 | Marason et al. |
| 10,055,882 B2 | 8/2018 | Marin et al. |
| 10,397,552 B2 | 8/2019 | Van Nieuwenhove et al. |
| 10,445,944 B2 | 10/2019 | Galera et al. |
| 2003/0235335 A1 | 12/2003 | Yukhin et al. |
| 2008/0273758 A1 | 11/2008 | Fuchs |
| 2009/0016650 A1 | 1/2009 | Bell et al. |
| 2009/0224868 A1 | 9/2009 | Liu et al. |
| 2010/0146333 A1 | 6/2010 | Yong et al. |
| 2010/0166294 A1 | 7/2010 | Marrion et al. |
| 2011/0001799 A1 | 1/2011 | Rothenberger |
| 2011/0264266 A1 | 10/2011 | Kock |
| 2012/0098935 A1 | 4/2012 | Schmidt et al. |
| 2015/0272809 A1 | 10/2015 | Accoto et al. |
| 2015/0358594 A1 | 12/2015 | Marshall et al. |
| 2016/0140817 A1 | 5/2016 | Beagley et al. |
| 2016/0182791 A1 | 6/2016 | Lewkow et al. |
| 2016/0354927 A1 | 12/2016 | Kikkeri et al. |
| 2017/0302905 A1 | 10/2017 | Shteinfeld |
| 2017/0320212 A1 | 11/2017 | Frisk et al. |
| 2018/0059224 A1 | 3/2018 | Wang et al. |
| 2018/0089847 A1 | 3/2018 | Lee et al. |
| 2018/0106891 A1 | 4/2018 | Thurner |
| 2018/0246215 A1 | 8/2018 | Yang et al. |
| 2018/0309970 A1 | 10/2018 | Gupta et al. |
| 2018/0374239 A1 | 12/2018 | Wallack et al. |
| 2019/0006046 A1 | 1/2019 | Kusens et al. |
| 2019/0146073 A1 | 5/2019 | Gutierrez et al. |
| 2019/0170506 A1 | 6/2019 | Matsumoto |
| 2019/0294918 A1 | 9/2019 | Witchey et al. |
| 2019/0360176 A1 | 11/2019 | Shimoda |
| 2019/0392595 A1 | 12/2019 | Uhlenbrock et al. |
| 2020/0333142 A1 | 10/2020 | Wang et al. |
| 2021/0053227 A1 | 2/2021 | Wartenberg et al. |
| 2021/0260770 A1 | 8/2021 | Vu et al. |

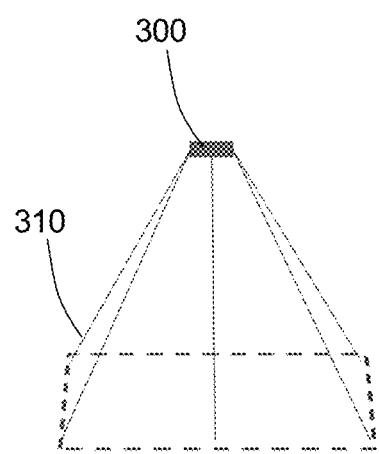
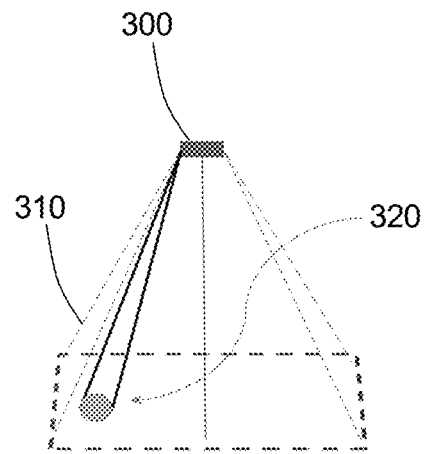
FIG. 3A  FIG. 3B

SENSOR FOR SAFE DETECTION OF INTRUSIONS IN A 3D VOLUME

CROSS-REFERENCE TO RELATED APPLICATIONS

This application claims priority to and the benefit of, and incorporates herein by reference in its entirety, U.S. Provisional Patent Application No. 63/438,022, filed on Jan. 10, 2023. This application is also a continuation-in-part of U.S. Ser. No. 17/103,427, filed on Nov. 24, 2020, which is a continuation of U.S. Ser. No. 16/553,724, filed on Aug. 28, 2019, now issued as U.S. Pat. No. 10,887,578, which claims priority to and the benefit of U.S. Provisional Patent Application No. 62/724,941, filed on Aug. 30, 2018. The entire disclosure of each of these documents is incorporated by reference in its entirety herein.

FIELD OF THE INVENTION

The field of the invention relates, generally, to monitoring of industrial environments where humans and machinery interact or come into proximity, and in particular to systems and methods for detecting unsafe conditions in a monitored workspace.

BACKGROUND

Industrial machinery is often dangerous to humans. Some machinery is dangerous unless it is completely shut down, while other machinery may have a variety of operating states, some of which are hazardous and some of which are not. In some cases, the degree of hazard may depend on the location or distance of the human with respect to the machinery. As a result, many "guarding" approaches have been developed to separate humans and machines and to prevent machinery from causing harm to humans. One very simple and common type of guarding is simply a cage that surrounds the machinery, configured such that opening the door of the cage causes an electrical circuit to place the machinery in a safe state. If the door is placed sufficiently far from the machinery to ensure that the human can't reach it before it shuts down, this ensures that humans can never approach the machinery while it is operating. Of course, this prevents all interaction between human and machine, and severely constrains use of the workspace.

The problem is exacerbated if not only humans but also the machinery (e.g., a robot) can move within the workspace. Both may change position and configuration in rapid and uneven ways. Typical industrial robots are stationary, but nonetheless have powerful arms that can cause injury over a wide "envelope" of possible movement trajectories. Additionally, robots are often mounted on a rail or other type of external axis, and additional machinery is often incorporated into the robot's end effector, both of which increase the effective total envelope of the robot.

Sensors such as light curtains can be substituted for cages or other physical barriers, providing alternative methods to prevent humans and machinery from coming into contact. Sensors such as two-dimensional (2D) light detection and ranging (LIDAR) sensors can provide more sophisticated capabilities, such as allowing the industrial machinery or robot to slow down or issue a warning when an intrusion is detected in an outer zone and stop only when an intrusion is detected in an inner zone. Additionally, a system using a 2D LIDAR can define multiple zones in a variety of shapes.

Because human safety is at stake, guarding equipment must typically comply with stringent industry standards regarding functional safety, such as ISO 13849, IEC 61508, and IEC 62061. These standards specify maximum failure rates for hardware components and define rigorous development practices for both hardware and software components that must be complied with in order for a system to be considered safe for use in industrial settings.

Such systems must ensure that dangerous conditions and system failures can be detected with very high probability, and that the system responds to such events by transitioning the equipment being controlled into a safe state. For example, a system that detects zone intrusion may be biased toward registering an intrusion, i.e., risking false positives in order to avoid the hazardous consequences of a false negative.

One new class of sensor that shows significant promise for use in machine guarding provides three-dimensional (3D) depth information. Examples of such sensors include 3D time-of-flight cameras, 3D LIDAR, and stereo vision cameras. These sensors offer the ability to detect and locate intrusions into the area surrounding industrial machinery in 3D, which has several advantages over 2D systems. In particular, for complex workcells it can be very difficult to determine a combination of 2D planes that effectively covers the entire space for monitoring purposes; 3D sensors, properly configured, can alleviate this issue.

For example, a 2D LIDAR system guarding the floorspace of an industrial robot will have to preemptively stop the robot when an intrusion is detected well beyond an arm's-length distance away from the robot (the "Protective Separation Distance" or PSD), because if the intrusion represents a person's legs, that person's arms could be much closer and would be undetectable by the 2D LIDAR system. For sensors that cannot detect arms or hands, the PSD has an extra term called the intrusion distance that is typically set to 850 mm. A 3D system, by contrast, can allow the robot to continue to operate until the person actually stretches his or her arm towards the robot. This provides a much tighter interlock between the actions of the machine and the actions of the human, which avoids premature or unnecessary shut-downs, facilitates many new safe applications and workcell designs, and saves space on the factory floor (which is always at a premium).

Another application of 3D sensing involves tasks that are best achieved by humans and machines working collaboratively together. Humans and machines have very different strengths and weaknesses. Typically, machines may be stronger, faster, more precise, and offer greater repeatability. Humans have flexibility, dexterity, and judgment far beyond the abilities of even the most advanced machines. An example of a collaborative application is the installation of a dashboard in a car—the dashboard is heavy and difficult for a human to maneuver, but attaching it requires a variety of connectors and fasteners that require human dexterity. A guarding system based on 3D sensing could enable industrial engineers to design processes that optimally allocate subtasks to humans and machines in a manner that best exploits their different capabilities while preserving safety.

2D and 3D sensing systems may share underlying technologies. RGB cameras and stereo vision cameras, for example, utilize a lens and sensor combination (i.e., a camera) to capture an image of a scene that is then analyzed algorithmically. A camera-based sensing system typically includes several key components. A light source illuminates the object being inspected or measured. This light source may be part of the camera, as in active sensing systems, or independent of the camera, such as a lamp illuminating the field of view of the camera, or even ambient light. A lens focuses the reflected light from the object and provides a wide field of view. An image sensor (usually a CCD or CMOS array) converts light into electrical signals. A camera module usually integrates the lens, image sensor, and necessary electronics to provide electrical input for further analysis.

The signal from the camera module is fed to an image-capture system, such as a frame grabber, which stores and further processes the 2D or 3D image signal. A processor runs image-analysis software for identification, measurement, and location of objects within the captured scene. Depending on the specific design of the system, the processor can use central-processing units (CPUs), graphics-processing units (GPUs), field-programmable gate arrays (FPGAs), or any number of other architectures, which may be deployed in a stand-alone computer or integrated in the camera module.

2D camera-based methods are well-suited to detecting defects or taking measurements using well-known image-processing techniques, such as edge detection or template matching. 2D sensing is used in unstructured environments and, with the aid of advanced image-processing algorithms, may compensate for varying illumination and shading conditions. However, algorithms for deriving 3D information from 2D images may lack robustness and suitability for safety-critical applications, as their failure modes are hard to characterize.

While a typical image provides 2D information of an object or space, a 3D camera adds another dimension and estimates the distance to objects and other elements in a scene. 3D sensing can therefore provide the 3D contour of an object or space, which can itself be used to create a 3D map of the surrounding environment and position an object relative to this map. Robust 3D vision overcomes many problems of 2D vision, as the depth measurement can be used to easily separate foreground from background. This is particularly useful for scene understanding, where the first step is to segment the subject of interest (foreground) from other parts of the image (background).

A widely-used 3D camera-based sensing approach is stereoscopic vision, or stereo vision. Stereo vision generally uses two spaced-apart cameras in a physical arrangement similar to human eyes. Given a point-like object in space, the camera separation will lead to measurable disparity of the object positions in the two camera images. Using simple pinhole camera geometry, the object's position in 3D can be computed from the images in each of the cameras. This approach is intuitive, but its real-world implementations are often not as simple. For example, features of the target need to be recognized first so that the two images can be compared for triangulation, but feature recognition involves relatively complex computation and may consume substantial processing power.

Further, 3D stereoscopic vision is highly dependent on the background lighting environment, and its effectiveness is degraded by shadows, occlusions, low contrast, lighting changes, or unexpected movements of the object or sensors. Therefore, often more than two sensors will be used to obtain a surrounding view of the target and thereby handle occlusions, or to provide redundancy to compensate for errors caused by a degraded and uncontrolled environment. Another common alternative is the use of structured light patterns to enhance a system's ability to detect features.

Another approach to 3D imaging utilizes lasers or other active light sources and detectors. A light source-detector system is similar to a camera-based system in that it also integrates lens and image sensors and converts optical signals into electrical signals, but there is no image captured. Instead, the image sensor measures the change of position and/or intensity of a tightly-focused light beam—usually a laser beam—over time. This change of position and/or intensity of the detected light beam is used to determine object alignment, throughput, reflective angles, time of flight, or other parameters to create images or maps of the space or object under observation. Light source-detector combinations include active triangulation, structured light, LIDAR, and time-of-flight sensors.

Active triangulation mitigates the environmental limitations of stereoscopic 3D by proactively illuminating objects under study with a narrowly focused light source. The wavelength of the active illumination can be controlled, and the sensors can be designed to ignore light at other wavelengths, thereby reducing ambient light interference. Further, the location of the light source can be changed, allowing the object to be scanned across points and from multiple angles to provide a complete 3D picture of the object.

3D structured light is another approach based on triangulation and an active light source. In this approach, a pre-designed light pattern, such as parallel lines, a grid, or speckles, is beamed on the target. The observed reflected pattern will be distorted by the contour of the target, and the contour as well as the distance to the object can be recovered by analysis of the distortion. Successive projections of coded or phase-shifted patterns are often required to extract a single depth frame, which leads to lower frame rates, which in turn mean that the subject must remain relatively still during the projection sequence to avoid blurring.

Compared to a simple active triangulation, structured light adds "feature points" to the target. As feature points are pre-determined (i.e., spatially encoded) and very recognizable, the structured light approach makes feature recognition easier and triangulation therefore faster and more reliable. This technology shifts complexity from the receiver to the source and requires more sophisticated light sources but simpler sensors and lower computational intensity.

Scanning LIDAR measures the distance to an object or space by illuminating it with a pulsed laser beam and measuring the reflected pulses with a sensor. By scanning the laser beam in 2D and 3D, differences in laser return times and wavelengths can be used to make 2D or 3D representations of the scanned object or space. LIDAR uses ultraviolet (UV), visible, or near-infrared light, which is typically reflected via backscattering to form an image or map of the space or object being under study.

A 3D time-of-flight (ToF) camera works by illuminating the scene with a modulated light source and observing the reflected light. The phase shift between the illumination and the reflection is measured and translated to distance. Unlike LIDAR, the light source is not scanned; instead the entire scene is illuminated simultaneously, resulting in higher frame rates. Typically, the illumination is from a solid-state laser or LED operating in the near-infrared range (~800-1500 nm) invisible to the human eye. An imaging sensor responsive to the same spectrum receives the light and converts the photonic energy to electrical current, then to charge, and then to a digitized value. The light entering the sensor has a component due to ambient light, and a component from the modulated illumination source. Distance (depth) information is only embedded in the component reflected from the modulated illumination. Therefore, a high ambient component reduces the signal to noise ratio (SNR).

To detect phase shifts between the illumination and the reflection, the light source in a 3D ToF camera is pulsed or modulated by a continuous-wave source, typically a sinusoid or square wave. Distance is measured for every pixel in a 2D addressable array, resulting in a depth map, or collection of 3D points. Alternatively, a depth map can be rendered in a 3D space as a collection of points, or a point cloud. The 3D points can be mathematically connected to form a mesh onto which a textured surface can be mapped.

3D ToF cameras have been used in industrial settings but, to date, the deployments have tended to involve non-safety critical applications such as bin-picking and palletizing. Because existing off-the-shelf 3D ToF cameras are not safety-rated, they cannot be used in safety-critical applications such as machine guarding or collaborative robotics applications. Accordingly, there is a need for architectures and techniques that render 3D cameras, including ToF cameras, useful in applications requiring a high degree of safety and conformance to industry-recognized safety standards.

SUMMARY

Embodiments of the present invention utilize one or more 3D cameras (e.g., ToF cameras) in industrial safety applications. The 3D camera generates a depth map or a point cloud that may be used by external hardware and software to classify objects in a workcell and generate control signals for machinery. Besides meeting functional safety standards, embodiments of the invention can handle the rich, complex data provided by 3D imaging, processing these data to generate effective and reliable control outputs for industrial machinery.

Embodiments of the present invention also relate to systems and techniques for monitoring and safeguarding arbitrary 3D volumes using one or more sensors that provide 3D data, and safely determining one or more of (a) whether an intrusion has occurred in the safeguarded 3D volume, (b) from which direction the intrusion has occurred, and (c) whether the intrusion has left the safeguarded 3D volume, and from which direction. Embodiments of the invention also pertain to the imaging of safeguarded 3D volumes by more than one 3D sensor, and related techniques for intrusion detection. Systems and techniques provided herein may supplement or replace traditional hazard safeguarding technologies used in manufacturing and logistics environments, such as light curtains and 2D scanners.

Accordingly, in a first aspect, the invention relates to an image-processing system. In various embodiments, the system comprises first and second 3D sensors each for generating an output array of pixelwise values indicative of distances to objects within a field of view of the sensor, the fields of view of the first and second 3D sensors overlapping along separate optical paths; at least one processor for combining, from each 3D sensor, multiple sequentially obtained output arrays into a single resulting (i.e., combined) output array; first and second depth-compute engines, executable by the processor(s), for processing successive resulting output arrays originating from, respectively, the first and second 3D sensors, into pixelwise arrays of depth values; and a comparison unit, executable by the processor(s), for (i) detecting pixelwise differences in depth between corresponding processed resulting output arrays originating substantially simultaneously from the first and second 3D sensors and (ii) generating an alert signal if the detected differences in depth aggregate to exceed a noise metric. The depth-compute engines operate in a pipelined fashion so as to begin processing a new combined output array prior to completing processing of a previous combined output array In some embodiments, the 3D sensors are time-of-flight (ToF) sensors. The first and second depth-compute engines and the comparison unit may, for example, be executed by a field-programmable gate array.

In various embodiments, the system further comprises at least one temperature sensor, and the 3D sensors are responsive to the temperature sensor(s) and modify their respective output arrays in accordance therewith. Similarly, the system may further comprise at least one humidity sensor, in which case the 3D sensors will be responsive to the humidity sensor(s) and modify their respective output arrays in accordance therewith.

The multiple sequentially obtained output arrays may be combined into a single resulting output array using a dark frame captured by the 3D sensors under no illumination. The output array of pixelwise values may also include an optical intensity value for each value indicative of an estimated distance to an object within the sensor field of view, and the depth-compute engines may compute an error metric for each of the depth values based at least in part on the associated optical intensity value. The error metric may be further based on sensor noise, dark frame data and/or ambient light or temperature. In some embodiments, each of the depth-compute engines operates in a pipelined fashion whereby, after the execution of each of a plurality of computational processing steps, processing of an oldest combined output array is completed and processing of a newest combined output array is begun.

In some embodiments, the system further comprises a timer for storing a total cumulative operating time of the system. The timer is configured to issue an alert when a predetermined total cumulative operating time has been exceeded. The system may include a voltage monitor for over/under monitoring of all voltage rails of the system and for causing system power to be interrupted upon detection of a failure condition.

In another aspect, the invention pertains to an image-processing system comprising, in various embodiments, a plurality of 3D sensors each for (i) illuminating a field of view of the sensor and (ii) generating an output array of pixelwise values indicative of distances to objects within the illuminated field of view; and a calibration unit for (i) sequentially causing each of the 3D sensors to generate an output array while other 3D sensors are illuminating their fields of view and (ii) creating an interference matrix from the generated output arrays. The interference matrix indicates, for each of the 3D sensors, the degree of interference by other 3D sensors simultaneously active therewith.

The system may further comprise a processor for operating the 3D sensors in accordance with the interference matrix. The processor may suppress, during operation of one of the 3D sensors, simultaneous operation of one or more other 3D sensors. The processor may cause correction of the values obtained by one of the sensors during simultaneous operation of one or more other 3D sensors.

In some embodiments, the system further comprises an external sync for operating the 3D sensors individually without interference. The system may further comprise a timer for storing a total cumulative operating time of the system. The calibration unit may be responsive to the total cumulative operating time and configured to adjust the pixelwise values indicative of distances based thereon.

In various embodiments, the system further comprises at least one temperature sensor, and the calibration unit is responsive to the temperature sensor(s) and configured to adjust the pixelwise values indicative of distances based thereon. Similarly, the system may further comprise at least one humidity sensor, in which case the calibration unit is responsive to the humidity sensor(s) and configured to adjust the pixelwise values indicative of distances based thereon. The system may include a voltage monitor for over/under monitoring of all voltage rails of the system and for causing system power to be interrupted upon detection of a failure condition.

Yet another aspect of the invention relates to an image-processing system comprising, in various embodiments, at least one 3D sensor for generating an output array of pixelwise values, the values including an optical intensity value and a value indicative of an estimated distance to an object within a field of view of the sensor, a processor, and a depth-compute engine, executable by the processor, for processing successive combined output arrays originating from the at least one 3D sensor into a pixelwise array of depth values. Each of the depth values has an associated error metric based at least in part on the associated intensity value. The error metric may be further based on sensor noise, dark frame data, ambient light and/or temperature.

In some embodiments, the system further comprises a controller for operating a machine within a safety envelope. The safety envelope has a volume determined at least in part on the error metric of pixels sensed by the sensor(s) and corresponding to a person proximate to the machine. The system may include a voltage monitor for over/under monitoring of all voltage rails of the system and for causing system power to be interrupted upon detection of a failure condition.

In still another aspect, the invention pertains to a method of generating a digital representation of a 3D space and objects therein and detecting anomalies in the representation. In various embodiments, the method comprises the steps of disposing first and second 3D sensors in or proximate to the space; causing each of the sensors to generate an output array of pixelwise values indicative of distances to objects in the 3D space and within a field of view of the sensor, the fields of view of the first and second 3D sensors overlapping along separate optical paths; computationally combining, from each 3D sensor, multiple sequentially obtained output arrays into a single resulting output array; computationally processing, in a pipelined fashion, successive resulting output arrays originating from, respectively, the first and second 3D sensors, into pixelwise arrays of depth values; detecting pixelwise differences in depth between corresponding processed resulting output arrays originating substantially simultaneously from the first and second 3D sensors; and generating an alert signal if the detected differences in depth aggregate to exceed a noise metric.

The 3D sensors may be time-of-flight (ToF) sensors. In some embodiments, the method also comprises the step of providing at least one temperature sensor and causing the output arrays to be modified in response to an output of the temperature sensor(s). Similarly, in some embodiments, the method further comprises the step of providing at least one humidity sensor and causing the output arrays to be modified in response to an output of the humidity sensor(s).

Multiple sequentially obtained output arrays may be averaged or otherwise combined into a single resulting output array using a dark frame captured by the 3D sensors under no illumination. The output array of pixelwise values may also include an optical intensity value for each value indicative of an estimated distance to an object within a sensor field of view sensor, and the error metric may be based at least in part on the associated optical intensity value. Moreover, the error metric may be further based on sensor noise, dark frame data, ambient light and/or temperature.

In some embodiments, the method further comprises the steps of storing a total cumulative operating time of the system and issuing an alert when a predetermined total cumulative operating time has been exceeded. Execution may be pipelined such that after execution of each of a plurality of computational processing steps, as processing of the oldest combined output array is completed, processing of a newest combined output array is begun.

In yet another aspect, the invention pertains to a method of calibrating a sensor array for 3D depth sensing. In various embodiments, the method comprises the steps of providing a plurality of 3D sensors each for (i) illuminating a field of view of the sensor and (ii) generating an output array of pixelwise values indicative of distances to objects within the illuminated field of view; sequentially causing each of the 3D sensors to generate an output array while other 3D sensors are illuminating their fields of view; and creating an interference matrix from the generated output arrays, the interference matrix indicating, for each of the 3D sensors, a degree of interference by other 3D sensors simultaneously active therewith.

The 3D sensors may be operated in accordance with the interference matrix such that, during operation of one of the 3D sensors, simultaneous operation of one or more other 3D sensors is suppressed and/or the values obtained by one of the sensors during simultaneous operation of one or more other 3D sensors are corrected. The 3D sensors may be externally synchronized so as to operate them individually without interference.

In various embodiments, the method further comprises the step of storing a total cumulative operating time of the system and adjusting the pixelwise values based thereon. The method may further comprise the step of sensing a temperature and/or humidity and adjusting the pixelwise values based thereon.

Still another aspect of the invention pertains to a method of generating a digital representation of a 3D space and objects therein. In various embodiments, the method comprises the steps of providing at least one 3D sensor for generating an output array of pixelwise values, where the values include an optical intensity value and a value indicative of an estimated distances to an object within a field of view of the sensor; and processing successive combined output arrays originating from the 3D sensor(s) into a pixelwise array of depth values, each of the depth values having an associated error metric based at least in part on the associated intensity value.

The error metric may be further based on sensor noise, dark frame data, ambient light and/or temperature. In some embodiments, the method further comprises the step of operating a machine within a safety envelope, the safety envelope having a volume determined at least in part on the error metric of pixels sensed by the at least one sensor and corresponding to a person proximate to the machine.

In an aspect, embodiments of the invention feature a method of safely operating machinery in a three-dimensional workspace. A sensor is provided. The sensor is associated with a grid of pixels for recording images of the workspace within a field of view of the sensor. Each pixel has a pixel field of view extending therefrom and is configured to generate a depth value indicative of an estimated distance from the pixel to an object within the pixel field of view thereof. A three-dimensional safeguarded volume having an outer boundary is computationally defined within the field of view of the sensor by, at least in part, storing for each pixel (i) an entry point corresponding to a first distance from the pixel at which the pixel field of view enters the safeguarded volume, and (ii) an exit point corresponding to a second distance from the pixel at which the pixel field of view exits the safeguarded volume. At least a portion of the workspace is monitored with the sensor. During the monitoring, an intrusion into the safeguarded volume is signaled when, for at least one of the pixels, the reported depth value is greater than the entry point of the pixel and less than the exit point of the pixel.

Embodiments of the invention may include one or more of the following in any of a variety of combinations. One or more safety signals may be issued when and/or after the intrusion is signaled. Activity of the machinery may be restricted when and/or after the intrusion is signaled. Restricting activity of the machinery may include, consist essentially of, or consist of stopping the machinery or modifying (e.g., decreasing) an operation speed of the machinery. The at least one of the pixels for which the reported depth value is greater than the entry point of the pixel and less than the exit point of the pixel may be identified, and, based thereon, a distance between the intrusion and the machinery may be computationally determined. One or more safety signals may be issued when the distance between the intrusion and the machinery is less than a predetermined threshold. Activity of the machinery may be restricted when the distance between the intrusion and the machinery is less than the predetermined threshold.

One or more occlusion signals may be issued when, for at least one of the pixels, the reported depth value is less than the entry point of the pixel. The reported depth value(s) for the at least one of the pixels may also be reported. The machinery may be placed in a safe state when or after the occlusion signal is issued. Placing the machinery in the safe state may include, consist essentially of, or consist of stopping the machinery, modifying (e.g., decreasing) an operation speed of the machinery, and/or placing the machinery in a standby mode.

The machinery may include, consist essentially of, or consist of one or more robots. The safeguarded volume may include, consist essentially of, or consist of all or a portion of the sensor field of view. The sensor may include, consist essentially of, or consist of a 3D time-of-flight camera. The entry point and exit point for each pixel may be stored in a lookup table.

In another aspect, embodiments of the invention feature a system for safely operating machinery in a three-dimensional workspace. The system includes, consists essentially of, or consists of a sensor and a processor. The sensor is associated with a grid of pixels for recording images of the workspace within a field of view of the sensor. Each pixel has a pixel field of view extending therefrom and is configured to generate a depth value indicative of an estimated distance from the pixel to an object within the pixel field of view thereof. The processor is configured to computationally define within the field of view of the sensor a three-dimensional safeguarded volume having an outer boundary by, at least in part, storing for each pixel (i) an entry point corresponding to a first distance from the pixel at which the pixel field of view enters the safeguarded volume, and (ii) an exit point corresponding to a second distance from the pixel at which the pixel field of view exits the safeguarded volume. The processor is also configured to, during monitoring of the workspace with the sensor, signal an intrusion into the safeguarded volume when, for at least one of the pixels, the reported depth value is greater than the entry point of the pixel and less than the exit point of the pixel.

Embodiments of the invention may include one or more of the following in any of a variety of combinations. The processor may be configured to issue one or more safety signals when and/or after the intrusion is signaled. The processor may be configured to restrict activity of the machinery when and/or after the intrusion is signaled. Restricting activity of the machinery may include, consist essentially of, or consist of stopping the machinery or modifying (e.g., decreasing) an operation speed of the machinery. The processor may be configured to identify the at least one of the pixels for which the reported depth value is greater than the entry point of the pixel and less than the exit point of the pixel, and, based thereon, computationally determine a distance between the intrusion and the machinery. The processor may be configured to issue one or more safety signals when the distance between the intrusion and the machinery is less than a predetermined threshold. The processor may be configured to restrict activity of the machinery when the distance between the intrusion and the machinery is less than the predetermined threshold.

The processor may be configured to issue one or more occlusion signals when, for at least one of the pixels, the reported depth value is less than the entry point of the pixel. The processor may be configured to report the reported depth value(s) for the at least one of the pixels. The processor may be configured to place the machinery in a safe state when or after the occlusion signal is issued. Placing the machinery in the safe state may include, consist essentially of, or consist of stopping the machinery, modifying (e.g., decreasing) an operation speed of the machinery, and/or placing the machinery in a standby mode.

The machinery may include, consist essentially of, or consist of one or more robots. The safeguarded volume may include, consist essentially of, or consist of all or a portion of the sensor field of view. The sensor may include, consist essentially of, or consist of a 3D time-of-flight camera. The system may include a computer memory. The entry point and exit point for each pixel may be stored in a lookup table within the computer memory.

In yet another aspect, embodiments of the invention feature a method of safely operating machinery in a three-dimensional workspace. A sensor is provided. The sensor is associated with a grid of pixels for recording images of the workspace within a field of view of the sensor. Each pixel has a pixel field of view extending therefrom and is configured to generate a depth value indicative of an estimated distance from the pixel to an object within the pixel field of view thereof. A three-dimensional safeguarded volume having an outer boundary is computationally defined within the field of view of the sensor by, at least in part, storing for each pixel (i) an entry point corresponding to a first distance from the pixel at which the pixel field of view enters the safeguarded volume, and (ii) an exit point corresponding to a second distance from the pixel at which the pixel field of view exits the safeguarded volume. One or more entry regions each having an outer boundary adjacent to the outer boundary of the safeguarded volume are computationally defined within the field of view of the sensor. At least a portion of the workspace is monitored with the sensor. During the monitoring, an alert signal is generated when an intrusion by an obstruction is detected in an entry region. When the intrusion by the obstruction is detected in the entry region, a counter may be incremented if the obstruction is detected in the safeguarded volume and the counter may be decremented if the obstruction is not detected in the safeguarded volume.

In another aspect, embodiments of the invention feature a system for safely operating machinery in a three-dimensional workspace. The system includes, consists essentially of, or consists of a sensor and a processor. The sensor is associated with a grid of pixels for recording images of the workspace within a field of view of the sensor. Each pixel has a pixel field of view extending therefrom and is configured to generate a depth value indicative of an estimated distance from the pixel to an object within the pixel field of view thereof. The processor is configured to computationally define within the field of view of the sensor a three-dimensional safeguarded volume having an outer boundary by, at least in part, storing for each pixel (i) an entry point corresponding to a first distance from the pixel at which the pixel field of view enters the safeguarded volume, and (ii) an exit point corresponding to a second distance from the pixel at which the pixel field of view exits the safeguarded volume. The processor is also configured to computationally define within the field of view of the sensor one or more entry regions each having an outer boundary adjacent to the outer boundary of the safeguarded volume. The processor is also configured to, during monitoring of the workspace with the sensor, generate an alert signal when an intrusion by an obstruction is detected in an entry region. The processor may be configured to, when the intrusion by the obstruction is detected in the entry region, increment a counter if the obstruction is detected in the safeguarded volume and decrement the counter if the obstruction is not detected in the safeguarded volume.

In general, as used herein, the term "substantially" means±10%, and in some embodiments, ±5%. In addition, reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which:

FIG. 3A schematically illustrates a sensor field of view in accordance with various embodiments of the invention.

FIG. 3B schematically illustrates a pixel field of view in accordance with various embodiments of the invention.

DETAILED DESCRIPTION

The ensuing discussion describes embodiments involving one or more ToF cameras, but it should be understood that embodiments of the present invention may utilize any form of 3D sensor capable of recording a scene and assigning depth information, typically on a pixelwise basis, to a recorded scene. Functionally, the 3D camera generates a depth map or a point cloud that may be used by external hardware and software to classify objects in a workcell and generate control signals for machinery.

Figure 1:
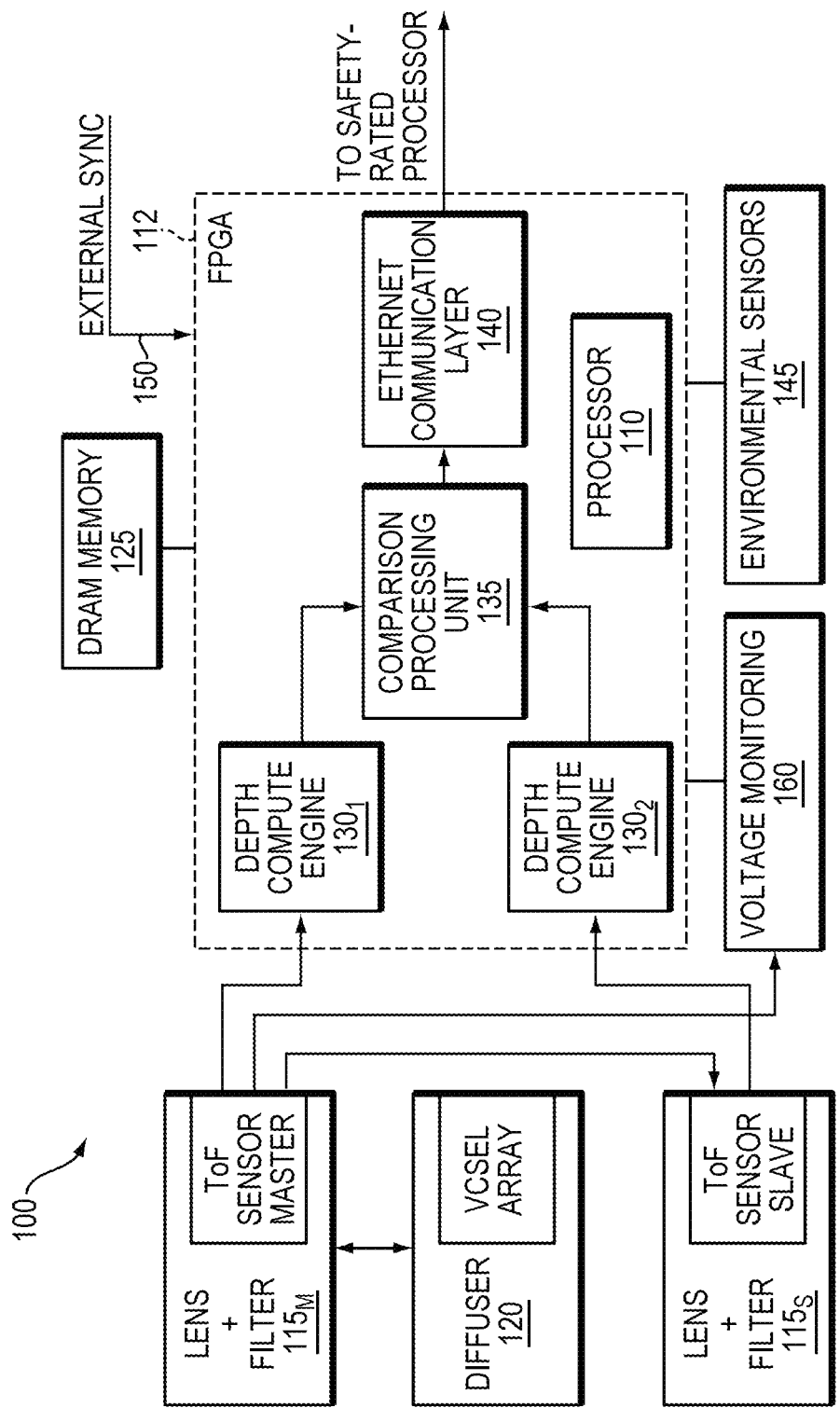
FIG. 1 schematically illustrates a camera architecture in accordance with an embodiment of the invention.

Refer first to FIG. 1, which illustrates a representative system 100 that may be configured as a camera within a single enclosure or as multiple separate components. The system 100, which may be implemented in a single housing as a camera, may include a processing unit 110 and a pair of 3D sensors 115, one of which (sensor $115_M$) operates as a master and the other (sensor $115_S$) as a slave. In various other embodiments, system 100 includes only one 3D sensor 115. The camera 100 (or, in some embodiments, each of the sensors 115) also includes a light source (e.g., a VCSEL laser source), suitable lenses and filters tuned to the light source. The reflected and backscattered light from the light source is captured by the lenses and recorded by the sensors 115. The light source may include a diffuser 120, although in low-power applications, a light-emitting diode (LED) may be used instead of a laser source and diffuser.

The processor 110 may be or include any suitable type of computing hardware, e.g., a microprocessor, but in various embodiments may be a microcontroller, peripheral integrated circuit element, a CSIC (customer-specific integrated circuit), an ASIC (application-specific integrated circuit), a logic circuit, a digital signal processor, a programmable logic device such as an FPGA (field-programmable gate array), PLD (programmable logic device), PLA (programmable logic array), RFID processor, graphics processing unit (GPU), smart chip, or any other device or arrangement of devices that is capable of implementing the steps of the processes of the invention.

In the illustrated embodiment, the processor 110 operates an FPGA and may advantageously provide features to support safety-rated operation, e.g., Safety Separation Design Flow to lock down place and route for safety-critical portions of the design; clock check; single event upset; CRC functions for various data and communication paths that cross the FPGA boundary; and usage of safety-rated functions for individual sub-modules. Within the processor's integrated memory and/or in a separate, primary random-access memory (RAM) 125—typically dynamic RAM, or DRAM—are instructions, conceptually illustrated as a group of modules that control the operation of the processor 110 and its interaction with the other hardware components. These instructions may be coded in any suitable programming language, including, without limitation, high-level languages such as C, C++, C#, Java, Python, Ruby, Scala, and Lua, utilizing, without limitation, any suitable frameworks and libraries such as TensorFlow, Keras, PyTorch, or Theano. Additionally, the software can be implemented in an assembly language and/or machine language directed to a microprocessor resident on a target device. An operating system (not shown) directs the execution of low-level, basic system functions such as memory allocation, file management and operation of mass storage devices. At a higher level, a pair of conventional depth-compute engines $130_1$, $130_2$ receive raw 3D sensor data and assign depth values to each pixel of the recorded scene. Raw data refers to the uncalibrated data coming from a sensor (e.g., 12 bits per pixel).

Using two independent lenses and 3D sensor modules 115 creates two separate optical paths. This redundancy allows for immediate detection if one of the camera modules 115 fails during operation. Also, by not picking up the exact same image from each lens and sensor combination, additional levels of processing can be performed by an image comparison module 135, which projects the response of a pixel from one optical path into corresponding pixels of the other optical path. (This projection may be determined, for example, during a calibration phase.) Failure modes that can be detected through this comparison include errant detections due to multiple reflections and sensor-sensor interference. When the two sensors 115 agree within an established noise metric based on the performance characteristics of the cameras, the two independent images can also be used to reduce noise and/or increase resolution. Redundant sensing for dual-channel imaging ensures that reliability levels required for safety-critical operation in industrial environments can be met.

If the comparison metric computed by the comparison module 135 is within the allowed range, the merged output is processed for output according to a network communication protocol. In the illustrated embodiment, output is provided by a conventional low-latency Ethernet communication layer 140. This output may be utilized by a safety-rated processor system for controlled machinery, and which is configured to issue safety signals, as described, for example, in U.S. Pat. No. 11,543,798, filed on Feb. 25, 2020 and issued on Jan. 3, 2023, the entire disclosure of which is hereby incorporated by reference.

The system 100 may include one or more environmental sensors 145 to measure conditions such as temperature and humidity. In one embodiment, multiple on-board temperature sensors 145 are disposed at multiple locations across the sensors 115—e.g., at the center of the illumination array, on the camera enclosure, and within the camera enclosure internally (one near the master sensor and one near the slave sensor)—for calibrating and correcting the 3D sensing modules as system-generated heat and ambient temperature changes or drifts affect the camera's operating parameters. For example, camera temperature variations can affect the camera's baseline calibration, accuracy, and operating parameters. Calibration may be employed to establish operating temperature ranges where performance is maintained; sensor detection of conditions outside these ranges can cause a shutdown, preventing dangerous failures. Temperature correction parameters may be estimated during calibration and then applied in real-time during operation. In one embodiment, the system 100 identifies a stable background image and uses this to constantly verify the correctness of the calibration and that the temperature-corrected image remains stable over time.

A fundamental problem with the use of depth sensors in safety-rated systems is that the depth result from each pixel is not known with 100% certainty. The actual distance to an object can differ from the reported depth. For well-illuminated objects, this difference is trivial and can be ignored. However, for less well-illuminated objects, the error between the reported depth and actual depth may become significant, manifesting as a mismatch between an object's actual and apparent location, and this mismatch will be randomized on a per-pixel basis. Pixel-level errors may arise from, for example, raw data saturation or clipping, unresolvable ambiguity distance as calculated by different modulation frequencies, a large intensity mismatch between different modulation frequencies, a predicted measurement error above a certain threshold due to low SNR, or excessive ambient light level. A safety-rated system that needs to know accurate distances cannot afford such errors. The approach taken by typical ToF cameras is to zero out the data for a given pixel if the received intensity is below a certain level. For pixels with medium or low received optical intensity, the system can either conservatively disregard the data and be totally blind for that pixel, or it can accept the camera's reported depth result—which may be off by some distance.

Accordingly, depth data provided in the output may include a predicted measurement error range of the depth result, on a per-pixel basis, based on raw data processing and statistical models. For example, it is common for ToF cameras to output two values per pixel: depth and optical intensity. Intensity can be used as a rough metric of data confidence (i.e., the reciprocal of error), so instead of outputting depth and intensity, the data provided in the output may be depth and an error range. The range error may also be predicted, on a per-pixel basis, based on variables such as sensor noise, dark frame data (as described below), and environmental factors such as ambient light and temperature.

Thus, this approach represents an improvement over simple pass/fail criteria as described above, which ignore all depth data for pixels with a signal-to-noise ratio (SNR) below a threshold. With a simple pass/fail approach, depth data is presented as if there is zero measurement error, so a safety-critical process that relies on the integrity of this data must set the SNR threshold sufficiently high that the actual measurement error has no safety impact at the system level. Pixels with medium to low SNR may still contain useful depth information despite having increased measurement error, and are either completely ignored (at a high SNR threshold) or are used with the incorrect assumption of zero measurement error (at a low SNR threshold). Including the measurement error range on a per-pixel basis allows a higher-level safety-critical process to utilize information from pixels with low to mid SNR levels while properly bounding the depth result from such pixels. This may improve overall system performance and uptime over the simple pass/fail approach, although it should be noted that a pass/fail criterion for very low SNR pixels can still be used with this approach.

In accordance with embodiments hereof, error detection can take different forms with the common objective of preventing erroneous depth results from being propagated to a higher-level safety-critical process, on a per-pixel basis, without simply setting a threshold for the maximum allowable error (or equivalently minimum required intensity). For example, a pixel's depth can be reported as 0 with a corresponding pixel error code. Alternatively, the depth-compute engines 130 can output the depth along with the expected range error, enabling the downstream safety-rated system to determine whether the error is sufficiently low to permit the pixel to be used.

For example, as described in U.S. Pat. No. 10,099,372, the entire disclosure of which is hereby incorporated by reference, a robot safety protocol may involve modulating the robot's maximum velocity (by which is meant the velocity of the robot itself or any appendage thereof) proportionally to the minimum distance between any point on the robot and any point in the relevant set of sensed objects to be avoided. The robot is allowed to operate at maximum speed when the closest object is further away than some threshold distance beyond which collisions are not a concern, and the robot is halted altogether if an object is within a certain minimum distance. Sufficient margin can be added to the specified distances to account for movement of relevant objects or humans toward the robot at some maximum realistic velocity. Thus, in one approach, an outer envelope or 3D zone is generated computationally around the robot. Outside this zone, all movements of, for example, a detected person are considered safe because, within an operational cycle, they cannot bring the person sufficiently close to the robot to pose a danger. Detection of any portion of the person's body within a second 3D zone, computationally defined within the first zone, does not prohibit the robot from continuing to operate at full speed. But if any portion of the detected person crosses the threshold of the second zone but is still outside a third interior danger zone within the second zone, the robot is signaled to operate at a slower speed. If any portion of the detected person crosses into the innermost danger zone—or is predicted to do so within the next cycle based on a model of human movement—operation of the robot is halted.

In this case, the safety zones may be adjusted (or the space considered occupied by the detected person may be expanded) based on estimated depth errors. The greater the detected error, the larger the envelope of the safety zones or the space assumed to be occupied by the detected person will be. In this way, the robot may continue operating based on error estimates instead of shutting down because too many pixels do not satisfy a pass/fail criterion.

Because any single image of a scene may contain noise, in operation, multiple images of a scene are obtained by both sensors 115 in rapid succession following a frame trigger. These "subframes" are then averaged or otherwise combined to produce a single final frame for each sensor 115. The subframe parameters and timing relative to the frame trigger can be programmable at the system level, and can be used to reduce cross-talk between sensors. Programming may include subframe timing to achieve time multiplexing, and also frequency modulation of the carrier.

As indicated in FIG. 1, an external sync 150 for frame-level and, in some cases, subframe triggering may be provided to allow multiple cameras 100 to cover the same scene with safety guarantees, allowing the camera outputs to be interlaced. The frame-level and subframe triggering may use time-sequence multiplexing to avoid interference. One camera 100 may be designated as a master that controls the overall timing of the cameras to ensure that only one is illuminating the scene at a time. This master provides trigger signals to the individual cameras to indicate when they should acquire the next frame or subframe.

Some embodiments utilize a dark frame (i.e., an image of the scene without illumination) for real-time correction of ambient noise and sensor offset. Often a differential measurement technique that uses multiple subframe measurements to cancel out noise sources is effective. However, by using the dark subframe not only as a measurement of ambient levels but also as a measurement of inherent camera noise, the number of subframes required can be decreased, which increases the amount of signal available for each subframe.

Figure 2:
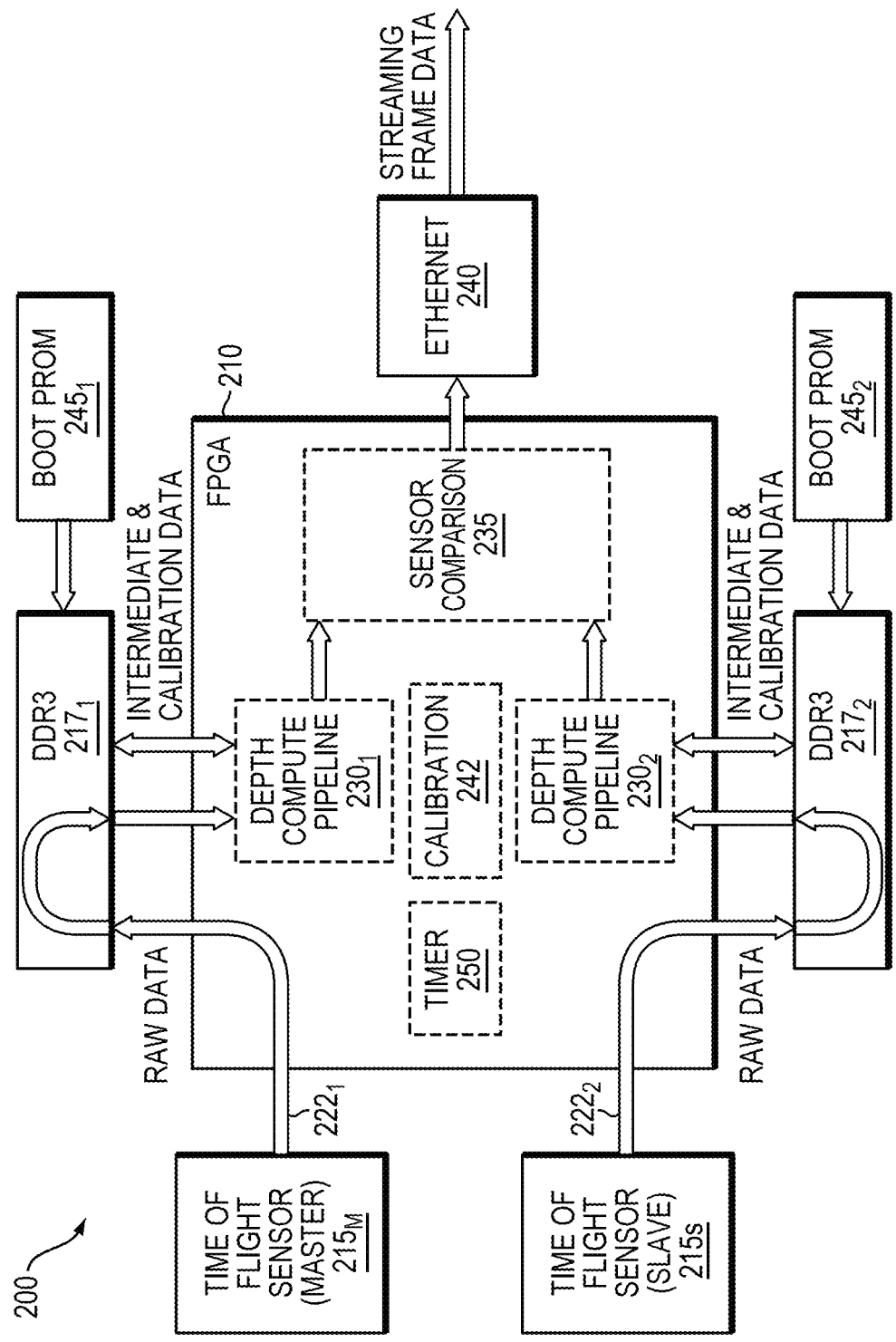
FIG. 2 schematically illustrates the data flow of the embodiment illustrated in FIG. 1.

As illustrated in FIG. 2, a pipeline architecture may be used to facilitate efficient subframe aggregation and processing as the next set of subframes is recorded. The architecture 200 representatively includes an FPGA 210, a pair of master-slave ToF sensors $215_M$, $215_S$, and a plurality of external DDR memory banks $217_1$, $217_2$ to support subframe aggregation from captured frame data. As subframes are captured by the sensors $215_M$, $215_S$, they follow a data path $221_1$, $222_2$, respectively, accumulating in the DDR memory banks 217 at a rate reflecting the difference between the rate of subframe capture and depth-compute processing.

Each data path 221 may have multiple DDR interfaces with error-correcting code (ECC) support to allow for simultaneous reading and writing of memory, but the two data paths 221 are independent. Each of the depth-compute pipelines $230_1$, $230_2$ operates in a pipelined fashion such that, after each processing step, a new frame can be started as an earlier frame is completed and intermediate frames are stepwise advanced through the processing path. Data relevant to calibration (e.g., temperature data) may be accumulated in the DDR banks 217 from the environmental sensors 145 and passed alongside contemporaneous sensor data to the depth-compute pipelines 230, so that at each processing step, the depth computation is performed in accordance with environmental conditions prevailing when the frame was acquired.

The new images with depth information that emerge after each time step from the depth-compute pipelines are compared by the sensor comparison processing unit 235 as described above and output as Ethernet data. FIG. 2 shows that the Ethernet communication layer 240 can, if desired, be implemented outside the FPGA 210.

In a typical deployment, multiple 3D ToF cameras are mounted and fixed in place around the workspace or object to be measured or imaged. An initial calibration step is performed by a calibration module 242 (shown for convenience as part of the system 200 but more typically implemented externally, e.g., as a stand-alone component) at each 3D ToF camera to correct for structured noise effects including temperature and optical distortions specific to the camera. Other metadata may also be captured, such as the subframe expected background image, which may be used for real-time monitoring of camera measurement stability. Each camera 100 can frame or subframe trigger an exposure by varying illumination frequencies and illumination levels, including the dark level captured by the camera under no illumination. Through the external subframe external sync 150, multiple 3D ToF cameras can be triggered at different frequencies and illumination levels to minimize interference and lower the latency of all the 3D ToF cameras in the workcell. By having a master that controls the overall timing of the cameras (to ensure that only one is illuminating the scene at a time), latency between all the cameras can be reduced and acquisition frequency increased.

Data flows from each sensor 215 through a data reception path in the FPGA 210 and into the associated DDR 217. The data is stored in the DDR 217 at a subframe level. Once a depth-compute engine 230 recognizes that a full subframe has accumulated in the associated DDR 217, it starts pulling data therefrom. Those pixels flow through the depth-compute engine 230 and are stored back in the associated DDR 217 as single-frequency depth values. These contain ambiguous depth results that need to be resolved later in the pipeline via comparison. Accordingly, as soon as the first three subframes needed for calculating the first single-frequency result are available in the DDR 217, the associated depth-compute engine will begin calculating the ambiguous depth on a pixelwise basis using those three subframes. While this is happening, the following three subframes for the second single-frequency result are loaded from sensor 215 into memory, and as subframe queues empty, they receive previously loaded data so that no processing cycles are wasted on fetches. Once the first single-frequency result is calculated and fully loaded into memory, the depth-compute engine will begin calculating the second single-frequency depth result in a similar fashion. Meanwhile the third set of subframes is loaded into memory.

However, rather than loading the second single-frequency depth result into memory as it is calculated, it is processed along with the first single-frequency depth result on a pixelwise basis to produce an unambiguous depth result. This result is then stored in memory as an intermediate value until it can be further compared to the second unambiguous depth result obtained from the third and fourth single-frequency depth results. This process is repeated until all the relevant subframes are processed. As a last step, all intermediate results are read from the DDR and final depth and intensity values are calculated.

Calibration can adjust not only for camera-specific performance differences but characterizing interference between cameras in a multiple-camera configuration. During initialization, one camera at a time illuminates the scene and other cameras determine how much signal is received. This procedure facilitates creation of an interference matrix, which may be stored in the DDR 217, that determines which cameras can illuminate at the same time. Alternatively, this approach can also be used to create a real-time correction similar to cross-talk correction techniques used for electronic signal transmission. In particular, the FPGAs 112 of multiple cameras may cooperate with each other (in, for example, an ad hoc network or with one camera designated as the master and the others operating as slaves) to sequentially cause each of the cameras to generate an output while the other cameras are illuminating their fields of view, and may share the resulting information to build up, and share, the interference matrix from the generated outputs. Alternatively, these tasks may be performed by a supervisory controller that operates all cameras.

Camera parameters such as temperature, distortion, and other metadata are captured during calibration and stored in the DDRs 217; these are used during real-time recalibration and camera operation. The calibration data contains the sensor's optical characteristics. The depth-compute pipeline utilizes these data along with the streaming frame data as well as data characterizing the sensor's fixed noise properties in computing depth and error as described above. Camera-specific calibration data is collected at the fabrication stage and uploaded to the DDR3 storage from a nonvolatile PROM $245_1$, $245_2$ at camera startup. During run time, the depth-compute engine 230 accesses the calibration data in real time from DDR3 memory as needed. In particular, real-time recalibration adjusts, in a conventional fashion, for drift of operating parameters such as temperature or illumination levels during operation. Health and status monitoring information may also be sent after every frame of depth data, and may include elements such as temperatures, pipeline error codes, and FPGA processing latency margins as needed for real-time recalibration.

An operating timer 250 (once again shown as an internal component for convenience, but which may be implemented externally) may be included to keep track of the hours of camera operation, periodically sending this data to the user via the communication layer 240. The calibration unit 242 may also receive this information to adjust operating parameters as the camera illumination system and other components age. Moreover, once the aging limit for VCSELs is reached, the timer 250 may produce an error condition to alert the user that maintenance is required.

The features described above address various possible failure modes of conventional 3D cameras or sensing systems, such as multiple exposures or common mode failures, enabling operation in safety-rated systems. The system may include additional features for safety-rated operation. One such feature is over/under monitoring of every voltage rail by a voltage monitor 160 (see FIG. 1) so that, if a failure condition is detected, the camera may be turned off immediately. Another is the use of a safety-rated protocol for data transmission between the different elements of the 3D ToF camera and the external environment, including the external sync. Broadly speaking, a safety-rated protocol will include some error checking to ensure that bad data does not get propagated through the system. It is possible to create a safety-rated protocol around a common protocol, such as UDP, which supports high bandwidths but is not inherently reliable. This is accomplished by adding safety features such as packet enumeration, CRC error detection, and frame ID tagging. These assure that the current depth frame is the correct depth frame for further downstream processing after the frame data is output from the camera.

Intrusion Detection Using a 3D Sensing System

The pixelwise array of depth and intensity values generated by one or more 3D cameras or sensors may be analyzed in a computing module to build a representation of the imaged volume for human safety purposes, such as for safely identifying intrusions. This analysis may be performed in a compute architecture that is itself safety-compliant, such as the one described in U.S. Pat. No. 11,543,798, the entire disclosure of which is incorporated herein by reference.

For example, the sensing elements in the 3D ToF camera detailed above may include two adjacent 3D sensors each for generating an output array of pixelwise values indicative of distances to objects within a field of view of the sensor, the fields of view of the 3D sensors overlapping along separate optical paths; one or more processors for combining, from each 3D sensor, multiple sequentially obtained output arrays into a single resulting (i.e., combined) output array; and two depth-compute engines, executable by the processor(s), for processing successive resulting output arrays originating from, respectively, the two 3D sensors, into pixelwise arrays of depth values.

Another approach, which has the virtue of being architecturally simpler, is to use an FPGA and a safety processor, which may eliminate the need for a dual-channel compute architecture. That is, two separate sensors are not necessarily required to create a safety-rated camera. Rather, one may be based on an FPGA and a safety processor, or even on a different processing architecture that has sufficient reliability and fault tolerance.

With reference to FIG. 3A, each sensing element 300 is typically an array of individual pixels arranged in, for example, a square or rectangular grid. For the sake of simplicity herein, and consistent with the majority of 3D ToF sensing elements, rectangular-shaped sensing elements are considered (but other shapes may be possible). In various embodiments, the sensing element 300 may include any of the features detailed herein for sensor 100, and may be operatively coupled to (and configured for communication with) a safety processor configured to, for example, issue safety signals and other alerts based on inputs received from the sensing element 300 as detailed herein. In other embodiments, the sensing element 300 may be even simpler, and have, for example, a single-channel architecture with one sensor and one pipeline for computation.

The combined field of view of the pixel array (i.e., the sensor field of view 310) may be considered to be a rectangular-shaped pyramid emanating from the sensor focal point and expanding roughly at, for example, a 60-70 degree angle from the sensing element 300, as shown in FIG. 3A. The field of view of each individual pixel (i.e., a pixel field of view 320) is itself typically cone-shaped, the sum total of all the fields of view of the individual pixels constituting the sensor field of view 310, as shown in FIG. 3B. Hence the 3D sensor 300 is able to image the volume encompassed by its field of view 310 in 3D. One common embodiment, such as the one described in U.S. Pat. No. 10,099,372 (the entire disclosure of which is incorporated herein by reference), is to divide the imaged volume into a voxel grid. In this embodiment, raw data from the sensor is analyzed to determine whether, for each voxel, an object or boundary of the 3D mapped space has been definitively detected in the volume corresponding to that voxel.

Figure 4:
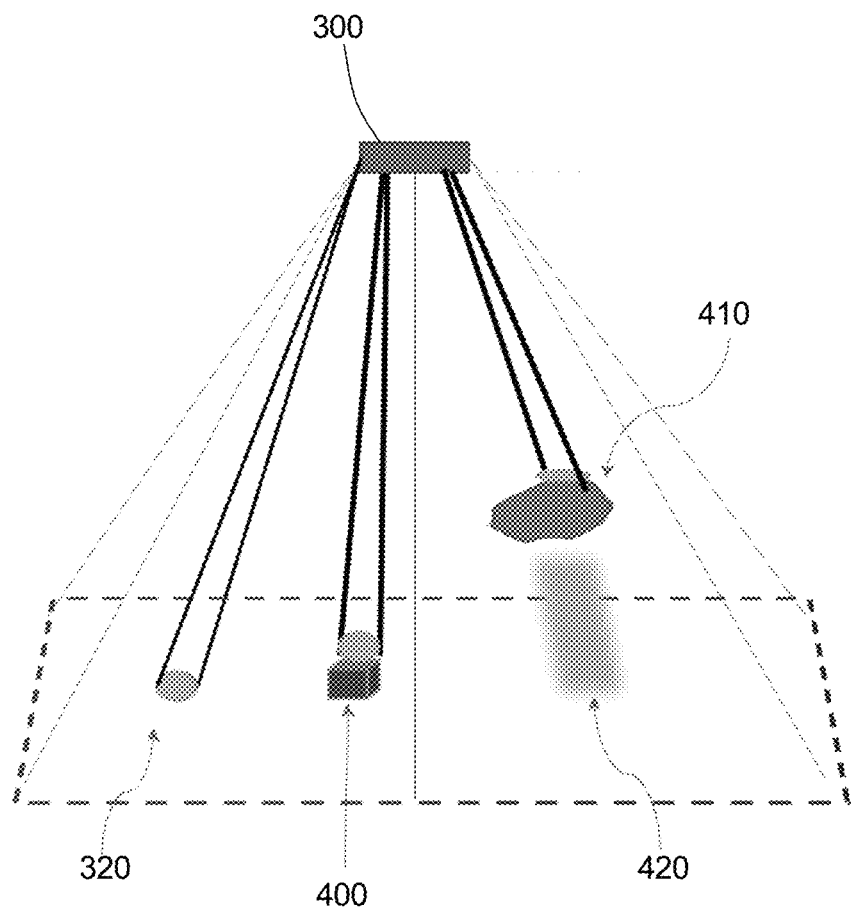
FIG. 4 schematically illustrates exemplary interactions between pixel fields of view and obstructions in accordance with various embodiments of the invention.

For the field of view of a particular pixel (or group of adjacent pixels), if there is no obstruction between the sensor 300 and the ultimate return surface (for example, the floor of the workcell or a fixed object or fixture 400 attached to the floor of the workcell), the particular pixel field of view(s) 320 would have an unobstructed return path and would be imaging the floor (or the fixed object 40 off the floor) of the safeguarded space (for example, a manufacturing workcell), as depicted on the left side of FIG. 4. In other words, every voxel that is crossed by a given pixel's field of view is empty and unobstructed.

On the other hand, if there were an obstruction 410 intruding into the field of view of a particular pixel or group of pixels, the field of view would be truncated, and a distance between the surface of obstruction 410 and the sensor 300 may be calculated from the depth data received by the pixel or group of pixels. The area below the obstruction 410 would be "shadowed" by the obstruction 410 and may be considered unknown space 420, as shown in FIG. 4. Since the unknown space is not visible to the sensor 300 (because of the obstruction 410), it may not be possible to conclusively determine whether the unknown space is occupied or not.

If the sensor 300 detects anything in a given voxel or field of view, all voxels that lie on the ray beginning at the focal point of that pixel and passing through the occupied voxel, and which are between the focal point and the occupied voxel, are classified as unoccupied, while all voxels that lie beyond the occupied voxel on that ray are classified as occluded for that sensor; all such occluded voxels may be considered "unknown." One approach to resolve whether an occluded voxel is definitely occupied or empty is the use of a second sensor that can image the same voxel from another angle where the occlusion can be resolved, as described in U.S. Pat. No. 10,099,372.

The intruding obstruction 410 may be any object as long as the object is opaque to the illumination (e.g., IR illumination) from the sensor 300 (e.g., a 3D ToF camera). If the sensor 300 is architected and designed to meet standards for human detection, such as International Electrotechnical Commission (IEC) 61496, Safety Of Machinery—Electro-Sensitive Protective Equipment (the entire disclosure of which is incorporated herein by reference), the sensor may be reliably used to detect human intrusions.

In embodiments of the present invention, since it is possible to determine the distance from each pixel (or group of pixels) at the sensor 300 and any IR-opaque obstruction in the pixel's field of view 320, a virtual 3D volume may be constructed where the distance between the boundaries of the 3D volume and each pixel at the sensor 300 is measurable. This distance is determined by the length of the straight line along the field of view of the pixel (or pixels) to the boundaries of the 3D volume.

Figure 5:
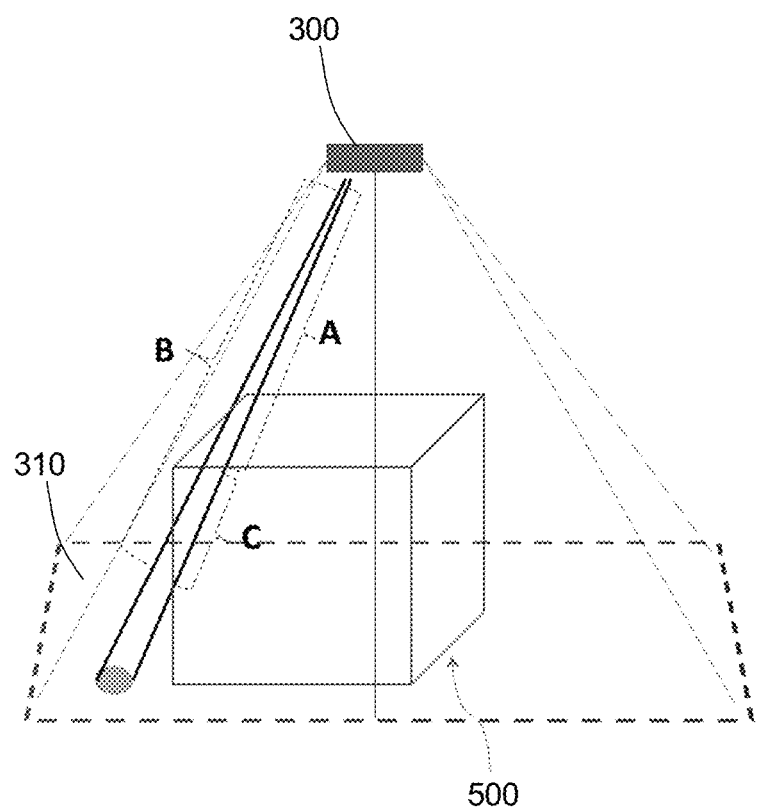
FIG. 5 schematically illustrates a computationally defined safeguarded 3D volume in accordance with various embodiments of the invention.

For example, FIG. 5 depicts an example cubic 3D volume 500 encompassed by the sensor field of view 310. The distance A corresponds to the distance along a particular pixel's field of view and the top of the cubic 3D volume 500, where the pixel field of view first encounters the top surface of the 3D volume 500. Distance B corresponds to the distance along the pixel's field of view to the point at which the field of view "exits" the 3D volume 500. Thus, when an obstruction is intruding anywhere along the field of view ray C, that is, anywhere at a distance C from the sensor 300 along the field of view where B>C>A, the obstruction may be considered to be intruding into the 3D volume 500.

The shape of the 3D volume 500 is arbitrary, as long as the 3D volume 500 is fully encompassed by the sensor field of view 310. This shape may be defined by a lookup table for each pixel field of view 320 indicating the distances to the entry point(s) of the 3D safeguarded volume 500 (shown, as an example, as A in FIG. 5) and distances to the exit points (shown as B in FIG. 5). The collection of lookup table elements {A,B} for each pixel defines the 3D volume 500. By varying {A,B} for each pixel an arbitrary geometric shape 500 may be safeguarded. At the extreme, this shape may be defined as the entire sensor field of view 320.

The shape of the 3D volume 500 may be determined by an operator and input into the system, with software to automatically generate the required lookup table, or the shape of the 3D volume 500 may be determined by imaging the field of view onto the volume 500 to be safeguarded to determine the shape of fixed objects already present in the volume 500. Objects on the floor of the workspace will return the envelope of their shape, defining the surface of the 3D volume 500 farthest from the sensor 300. Additionally, if this surface 500 changed during operation (for example, if workpieces or moving vehicles entered the space at predetermined times in the operating cycle), the system may be expecting this change in the floor surface and put the system in a safe state if the corresponding background is not consistent with what is expected at a particular point in the cycle.

Hence, any object or obstruction intruding the 3D volume 500 will trigger a return signal indicating a distance within the entry and exit values {A,B} of the lookup table for a given pixel (or group of pixels), indicating to the sensor 300 that the 3D volume 500 has been intruded upon by an obstruction 410. In one simple and non-computationally intensive embodiment, the lookup table result indicates an obstruction in the 3D volume 500, but not the location in the volume 500 at which the obstruction is present. Such a low-computation intensity approach may require a simpler compute architecture (such as an FPGA and/or a safety processor), rather than a dual-channel compute architecture as described in U.S. Pat. No. 11,543,798. Similarly, if the obstruction 410 were to exit the 3D volume 500, there would be an unobstructed field of view 320 all the way to point B, and hence the sensor 300 may report no occupation of the 3D safeguarded volume 500. A more complex approach, using more computational power, may allow the system to determine where in the safeguarded volume 500 the intrusion has occurred. For example, the system may identify the particular pixel field(s) of view 320, e.g., from the lookup table, where the intrusion is registered; the identification of the specific field(s) of view (e.g., voxel(s)) 320 and the registered distance to the sensor 300 (i.e., from the obstruction) enable determination of the location within the safeguarded volume 500 the intrusion has occurred.

In various embodiments of the invention, when an intrusion into the 3D volume 500 is registered, a safety signal may be issued by a safety processor i.e., a microprocessor, microcontroller, or other processor designed for integration into safety systems, (e.g., via a safety channel) in communication with the sensor 300. For example, the safety processor may issue the safety signal to machinery (e.g., one or more robots) within or near the workspace being monitored by the sensor 300. When the safety signal is issued, activity of the machinery may be restricted, e.g., the machinery may be stopped or have its operating speed modified (e.g., slowed). In addition or instead, the operator of the machinery may be alerted when the safety signal is issued via, e.g., a warning indicator or message.

Safety processors may have features or properties as detailed in, and safety signals may be issued in accordance with, descriptions provided in U.S. Pat. No. 11,543,798. For example, safety processors may operate in accordance with safety standards such as the International Standards Organization (ISO) 13849 standard, Safety of Machinery: Safety-Related Parts of Control Systems, and the International Electrotechnical Commission (IEC) 61508 (Functional Safety of Electrical/Electronic/Programmable Electronic Safety-Related Systems) and machinery-specific IEC 62061 (Safety of Machinery: Functional Safety of Electrical, Electronic and Programmable Electronic Control Systems) standards, the entire disclosure of each of which is incorporated by reference herein. ISO 13849 provides safety requirements and guidance for the design of safety-related components. ISO 13849 provides guidelines on the probability of failure of components and circuitry as measured by a performance level (PL). The PL, defined as the average probability of a dangerous failure of the component per hour, ranges from a (lowest) to e (highest). IEC 61508 and IEC 62061 specify four safety integrity levels (SILs) of performance for a safety function.

If the camera and compute architectures are designed for safety (for example, as detailed above), then the 3D volume 500 may be considered safeguarded and may be used for safely indicating that an obstruction is present with high reliability. However, systems and techniques in accordance with embodiments of the present invention make no assumption as to the physical nature of the obstruction (for example, if the obstruction is a human), only that the sensing architecture has sufficient reliability and a sufficiently low failure rate that the sensing architecture will not generate false negatives (when an obstruction is present but not detected), and in case of failure, the system will fail-safe, not leaving the sensing open to the possibility of false negatives.

An additional embodiment of the invention when the 3D volume 500 is safeguarded is the action to put the system in a safe state when the intrusion occurs at a distance less than the top of the safeguarded volume 500. For example, in FIG. 5, if the intrusion occurs at a distance less than A for a given pixel, the field of view of that particular pixel for distances greater than A is now occluded (as shown in FIG. 4), and it is indeterminable whether or not a second obstruction were to intrude the safeguarded 3D volume 500 below that point. In that case, maintenance of safe operation may dictate that the system be shut down or put on standby in a safe state, for example, alerting an operator and preventing restart until the obstruction has been cleared. For example, in response to such a detected occlusion, the safety processor may issue an occlusion signal (e.g., via a safety channel), indicating that the occlusion has been detected but that it is unknown whether or not the 3D volume 500 itself has been breached (e.g., by the object causing the occlusion or by another object therebelow). The occlusion signal may therefore connote different information, or a different state, than safety signals described above.

In response to the occlusion signal, the reported depth value of the intrusion may be reported, and/or the machinery may be placed in a safe state. For example, the machinery may be placed in a standby mode, may be stopped, or may have its operating speed modified (e.g., slowed).

Figure 6:
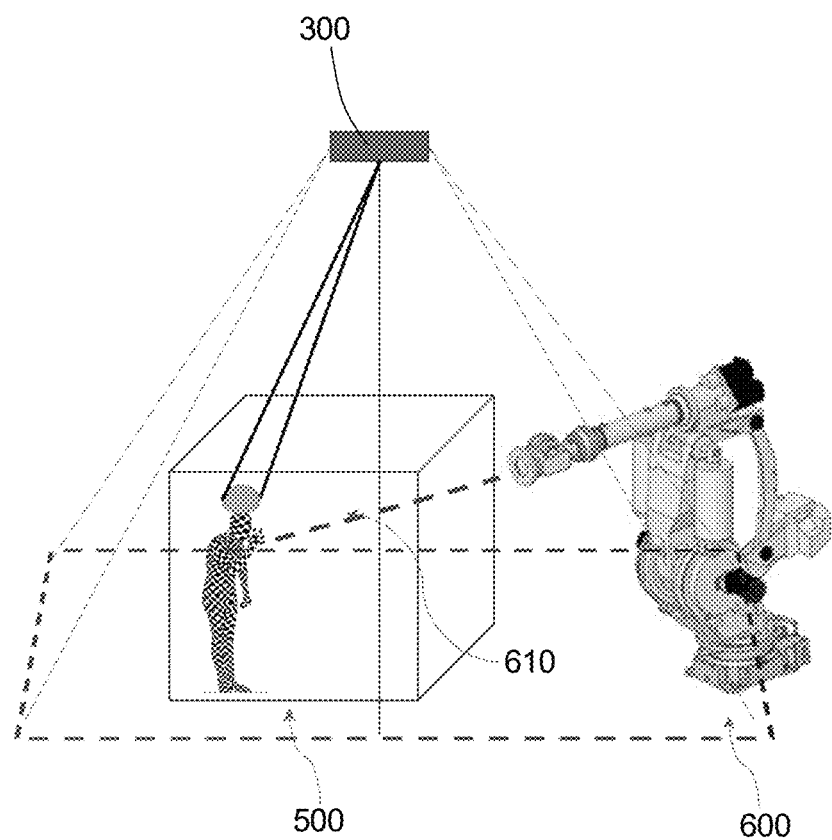
FIG. 6 schematically illustrates a sensor field of view with a safeguarded 3D volume and a hazard therewithin in accordance with various embodiments of the invention.

In accordance with embodiments of the invention utilized in a safety system for detecting intrusions into a 3D safeguarded volume 500, this safeguarded volume 500 may be considered to be adjacent to a hazard 600 (e.g., a robot or a dangerous machine). In such embodiments, one productive use of the safeguarded volume 500 is to prevent humans from approaching the hazard 600 closer than a predetermined minimum distance (which may be calculated from a safety standard such as ISO 13855 or ISO 13849), for example while machinery 600 is operating. An additional embodiment of the invention may use the location of the obstruction 410 of the 3D safeguarded space 500 relative to the hazard 600 to estimate the distance 610 between the obstruction 410 (e.g., a human) and the hazard 600. This distance 610 may be output (e.g., via the safety processor) for a safety system to determine whether the standards-derived minimum distance has been breached between the obstruction 410 and the hazard 600, and put the hazard 600 (e.g., machinery such as one or more robots) in a safe state. This distance 610 may be provided via a safety-rated channel so that information related to the distance 610 may be used by other safety systems in the workcell, as shown in FIG. 6.

Directional Intrusion Detection Using a 3D Sensing System

Using a lookup table to define the safeguarded 3D volume 500 allows for low-latency, low-computational complexity in determining if a 3D volume (e.g., a portion of a workcell) is occupied. The sensor 300 and a low-performance compute element such as a FPGA may be integrated in one hardware element with the camera illumination element and the sensor (s), as described above.

In various embodiments, the sensor 300 images the 3D volume in real time by illuminating the sensor field of view 310 and calculating a depth map of the field of view 310, of which the 3D safeguarded volume 500 is typically a subset. A simple comparator checks each pixel depth against the upper and lower limits in the table (which in aggregate form the 3D safeguarded volume 500) and may trigger a safety signal if a pixel (or a group of adjacent pixels) detects a signal return indicating an obstruction in the safeguarded 3D volume 500.

In various embodiments, additional computational capability may be included in order to determine the location of the obstruction 410 within the safeguarded 3D volume 500, as described above. Such additional computational capability may also be utilized for the distance calculation functionality described above.

Figure 7:
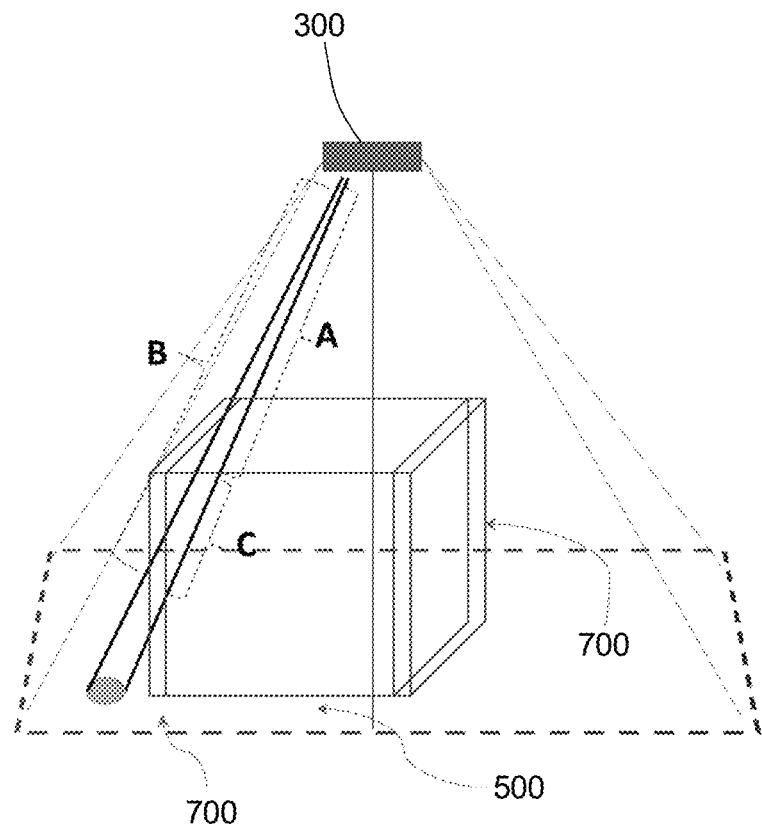
FIG. 7 schematically illustrates a sensor field of view with a safeguarded 3D volume with entry points in accordance with various embodiments of the invention.

In additional embodiments of the present invention, the 3D safeguarded volume may include a collection of contiguous or adjacent safeguarded volumes, with (but not limited to) a central safeguarded volume 500 bordered by one or more volumes 700 (which may be smaller or narrower, as shown) that serve as entry points to the central safeguarded volume 500, as shown in FIG. 7. Each of these volumes 700 may correspond to a subset of the sensor field of view 310 of the sensor 300, as detailed above, with a corresponding lookup table indicating intrusion. When an intrusion into one of the volumes 700 is detected, the system may, for example, issue an alert signal.

For example, referring again to FIG. 7, an intrusion at the left entry point 700 may be detected by the pixels imaging the narrow entry point volume and then by the pixels imaging the safeguarded 3D volume 500. If (for example) the intrusion exits through the right entry point 700, it may indicate relative motion between the two entry points. A running count may be kept of the number of times the entry points 700 are obstructed, and checking if the main 3D safeguarded volume 500 is occupied, and decrementing the count when the obstruction has passed through the entry points 700. A state machine requiring low computational power may be programmed to keep track of the running count and indicate whether the safeguarded 3D volume 500 is positively empty or occupied.

For example, if one of the entry points 700 is breached twice, it may be that the same obstruction entered and left through the same entry point 700. In that case, checking if the main volume 500 is occupied would confirm whether the obstruction has left or that a second obstruction has entered the volume 500. A state machine may keep a running count of entry points 700 being breached and confirming the main volume 500 as empty or occupied. By tracking which entry points 700 are breached, a measure of location of the obstruction within the 3D safeguarded volume 500 may be obtained with low computation effort.

In various embodiments, such techniques may be utilized to track and determine whether and obstruction (e.g., a human) has exited the main volume 500 in a more notable or potentially dangerous direction. For example, one or more of the entry points 700 may be designated as an "exit point," which, if breached, indicates that the departing obstruction is approaching an important and/or dangerous zone, e.g., toward particular machinery or a dangerous portion of a workspace. If, for example, the exit point is not breached while the main volume is determined to be empty, then it may be assumed that the obstruction departed from the main volume 500 in a different (e.g., potentially safer) direction.

Figure 8:
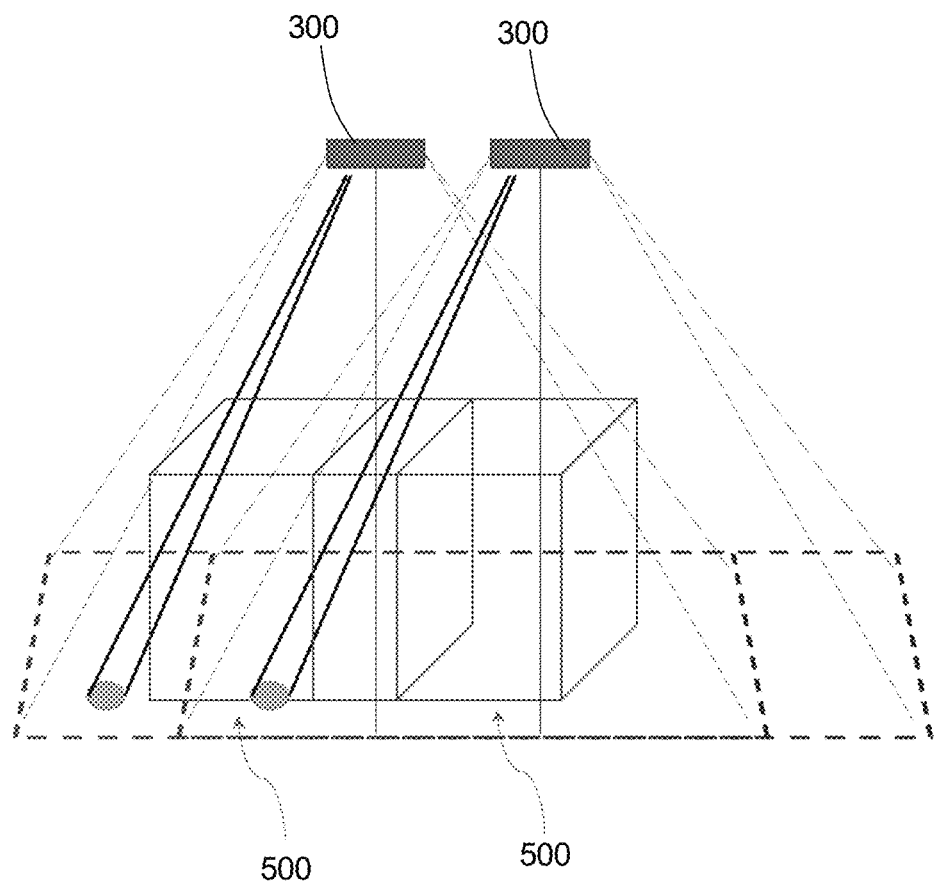
FIG. 8 schematically illustrates multiple safeguarded 3D volumes monitored by multiple sensors in accordance with various embodiments of the invention.

In various embodiments, two or more adjacent safeguarded volumes 500 may be overlapping (or even identical), and may be monitored by two or more sensors 300 that may be registered to each other during setup and installation, as shown in FIG. 8. Once the multiple sensors 300 are registered to each other, the two or more adjacent safeguarded volumes 500 may be considered to be a single, larger safeguarded volume, and the intrusion-detection techniques detailed above with reference to FIG. 7 may be applied to that larger volume. Registration of the sensors 300 to each other may be accomplished via, e.g., one or more techniques described in U.S. Pat. No. 11,156,981, filed on Aug. 28, 2019 and issued on Oct. 26, 2021, the entire disclosure of which is incorporated by reference herein. After the sensor registration is complete, a common reference frame of the sensors 300 may then be transformed to a global reference frame of the workspace such that the acquired data may be processed in the global frame.

Certain embodiments of the present invention are described above. It is, however, expressly noted that the present invention is not limited to those embodiments; rather, additions and modifications to what is expressly described herein are also included within the scope of the invention.

What is claimed is:

1. A method of safely operating machinery in a three-dimensional workspace, the method comprising:
providing a sensor associated with a grid of pixels for recording images of the workspace within a field of view of the sensor, each pixel (i) having a pixel field of view extending therefrom and (ii) being configured to generate a depth value indicative of an estimated distance from the pixel to an object within the pixel field of view thereof;
computationally defining within the field of view of the sensor a three-dimensional safeguarded volume having an outer boundary by, at least in part, storing for each pixel (i) an entry point corresponding to a first distance from the pixel at which the pixel field of view enters the safeguarded volume, and (ii) an exit point corresponding to a second distance from the pixel at which the pixel field of view exits the safeguarded volume;
monitoring the workspace with the sensor; and
signaling an intrusion into the safeguarded volume when, for at least one of the pixels, a reported depth value registered by a processor is greater than the entry point of the pixel and less than the exit point of the pixel.

2. The method of claim 1, further comprising issuing a safety signal when the intrusion is signaled.

3. The method of claim 2, further comprising restricting activity of the machinery when the intrusion is signaled.

4. The method of claim 3, wherein restricting activity of the machinery comprises stopping the machinery or modifying an operation speed of the machinery.

5. The method of claim 1, further comprising:
identifying the at least one of the pixels for which the reported depth value is greater than the entry point of the pixel and less than the exit point of the pixel; and
based thereon, computationally determining a distance between the intrusion and the machinery.

6. The method of claim 5, further comprising issuing a safety signal when the distance between the intrusion and the machinery is less than a predetermined threshold.

7. The method of claim 6, further comprising restricting activity of the machinery when the distance between the intrusion and the machinery is less than the predetermined threshold.

8. The method of claim 1, further comprising issuing an occlusion signal when, for at least one of the pixels, the reported depth value is less than the entry point of the pixel.

9. The method of claim 8, further comprising reporting the reported depth value for the at least one of the pixels.

10. The method of claim 8, further comprising placing the machinery in a safe state when the occlusion signal is issued.

11. The method of claim 10, wherein placing the machinery in the safe state comprises stopping the machinery, modifying an operation speed of the machinery, or placing the machinery in a standby mode.

12. The method of claim 1, wherein the machinery comprises at least one robot.

13. The method of claim 1, wherein the safeguarded volume is only a portion of the sensor field of view.

14. The method of claim 1, wherein the sensor comprises a 3D time-of-flight camera.

15. The method of claim 1, wherein the entry point and exit point for each pixel are stored in a lookup table.

16. A system for safely operating machinery in a three-dimensional workspace, the system comprising:
- a sensor associated with a grid of pixels for recording images of the workspace within a field of view of the sensor, each pixel (i) having a pixel field of view extending therefrom and (ii) being configured to generate a depth value indicative of an estimated distance from the pixel to an object within the pixel field of view thereof; and
- a processor for:
  - computationally defining within the field of view of the sensor a three-dimensional safeguarded volume having an outer boundary by, at least in part, storing for each pixel (i) an entry point corresponding to a first distance from the pixel at which the pixel field of view enters the safeguarded volume, and (ii) an exit point corresponding to a second distance from the pixel at which the pixel field of view exits the safeguarded volume; and
  - during monitoring of the workspace with the sensor, signaling an intrusion into the safeguarded volume when, for at least one of the pixels, a reported depth value registered by the processor is greater than the entry point of the pixel and less than the exit point of the pixel.

17. The system of claim 16, wherein the processor is configured to issue a safety signal when the intrusion is signaled.

18. The system of claim 17, wherein the processor is configured to restrict activity of the machinery when the intrusion is signaled.

19. The system of claim 18, wherein restricting activity of the machinery comprises stopping the machinery or modifying an operation speed of the machinery.

20. The system of claim 16, wherein the processor is configured to:
- identify the at least one of the pixels for which the reported depth value is greater than the entry point of the pixel and less than the exit point of the pixel; and
- based thereon, computationally determine a distance between the intrusion and the machinery.

21. The system of claim 20, wherein the processor is configured to issue a safety signal when the distance between the intrusion and the machinery is less than a predetermined threshold.

22. The system of claim 21, wherein the processor is configured to restrict activity of the machinery when the distance between the intrusion and the machinery is less than the predetermined threshold.

23. The system of claim 16, wherein the processor is configured to issue an occlusion signal when, for at least one of the pixels, the reported depth value is less than the entry point of the pixel.

24. The system of claim 23, wherein the processor is configured to report the reported depth value for the at least one of the pixels.

25. The system of claim 23, wherein the processor is configured to place the machinery in a safe state when the occlusion signal is issued.

26. The system of claim 25, wherein placing the machinery in the safe state comprises stopping the machinery, modifying an operation speed of the machinery, or placing the machinery in a standby mode.

27. The system of claim 16, wherein the machinery comprises at least one robot.

28. The system of claim 16, wherein the safeguarded volume is only a portion of the sensor field of view.

29. The system of claim 16, wherein the sensor comprises a 3D time-of-flight camera.

30. The system of claim 16, further comprising a computer memory, wherein the entry point and exit point for each pixel are stored in a lookup table within the computer memory.

31. A method of safely operating machinery in a three-dimensional workspace, the method comprising:
- providing a sensor associated with a grid of pixels for recording images of the workspace within a field of view of the sensor, each pixel (i) having a pixel field of view extending therefrom and (ii) being configured to generate a depth value indicative of an estimated distance from the pixel to an object within the pixel field of view thereof;
- computationally defining within the field of view of the sensor a three-dimensional safeguarded volume having an outer boundary by, at least in part, storing for each pixel (i) an entry point corresponding to a first distance from the pixel at which the pixel field of view enters the safeguarded volume, and (ii) an exit point corresponding to a second distance from the pixel at which the pixel field of view exits the safeguarded volume;
- computationally defining within the field of view of the sensor one or more entry regions each having an outer boundary adjacent to the outer boundary of the safeguarded volume;
- monitoring the workspace with the sensor; and
- generating an alert signal when an intrusion by an obstruction is detected in an entry region.

32. The method of claim 31, further comprising, when the intrusion by the obstruction is detected in the entry region, incrementing a counter if the obstruction is detected in the safeguarded volume and decrementing the counter if the obstruction is not detected in the safeguarded volume.

33. A system for safely operating machinery in a three-dimensional workspace, the system comprising:
- a sensor associated with a grid of pixels for recording images of the workspace within a field of view of the sensor, each pixel (i) having a pixel field of view extending therefrom and (ii) being configured to generate a depth value indicative of an estimated distance from the pixel to an object within the pixel field of view thereof; and
- a processor for:
  - computationally defining within the field of view of the sensor a three-dimensional safeguarded volume having an outer boundary by, at least in part, storing for each pixel (i) an entry point corresponding to a first distance from the pixel at which the pixel field of view enters the safeguarded volume, and (ii) an exit point corresponding to a second distance from the pixel at which the pixel field of view exits the safeguarded volume;
  - computationally defining within the field of view of the sensor one or more entry regions each having an outer boundary adjacent to the outer boundary of the safeguarded volume; and
  - during monitoring of the workspace with the sensor, generating an alert signal when an intrusion by an obstruction is detected in an entry region.

34. The system of claim 33, wherein the processor is configured to, when the intrusion by the obstruction is detected in the entry region, increment a counter if the obstruction is detected in the safeguarded volume and decrement the counter if the obstruction is not detected in the safeguarded volume.

* * * * *